(12) United States Patent
Gupta et al.

(10) Patent No.: US 10,179,826 B2
(45) Date of Patent: Jan. 15, 2019

(54) POLYMERIZATION CATALYST DELIVERY

(71) Applicant: Chevron Phillips Chemical Company LP, The Woodlands, TX (US)

(72) Inventors: Anurag Gupta, Sugar Land, TX (US); Anne M Balinsky, Kingwood, TX (US); Robert R McElvain, Kingwood, TX (US); John D Stewart, Friendswood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/587,629

(22) Filed: May 5, 2017

(65) Prior Publication Data

US 2018/0319909 A1 Nov. 8, 2018

(51) Int. Cl.
*C08F 110/02* (2006.01)

(52) U.S. Cl.
CPC ................... *C08F 110/02* (2013.01)

(58) Field of Classification Search
CPC .. B01J 8/0015; B01J 8/24; B01J 2208/00752; B01J 2219/182; C08F 10/00; C08F 2/34; C08F 110/06; C08F 2500/15; Y10S 526/905; Y10S 526/919; Y10S 526/901
USPC .......................................................... 526/348
See application file for complete search history.

(56) References Cited

U.S. PATENT DOCUMENTS

| | | | |
|---|---|---|---|
| 2,964,511 A | 12/1960 | Cottle | |
| 3,248,179 A | 4/1966 | Norwood | |
| 3,321,280 A | 5/1967 | Trotter, Jr. et al. | |
| 4,613,484 A | 9/1986 | Ayres et al. | |
| 4,767,735 A | 8/1988 | Ewen et al. | |
| 5,455,314 A | 10/1995 | Burns et al. | |
| 5,565,174 A | 10/1996 | Burns et al. | |
| 5,565,175 A | 10/1996 | Hottovy et al. | |
| 5,575,979 A | 11/1996 | Hanson | |
| 5,859,157 A * | 1/1999 | Gupte | B01J 8/0015 422/131 |
| 6,093,211 A | 7/2000 | Hamielec et al. | |
| 6,107,230 A | 8/2000 | McDaniel et al. | |
| 6,239,235 B1 | 5/2001 | Hottovy et al. | |

(Continued)

FOREIGN PATENT DOCUMENTS

| | | |
|---|---|---|
| EP | 1563901 A1 | 8/2005 |
| WO | 2004026455 A2 | 4/2004 |

OTHER PUBLICATIONS

International Search Report of the International Searching Authority in PCT/US2018/029326 dated Oct. 9, 2018, 6 pages.

*Primary Examiner* — William K Cheung
(74) *Attorney, Agent, or Firm* — Conley Rose, P.C.

(57) ABSTRACT

A process is described for introducing a catalyst into a polymerization zone by detecting one or a combination of (i) a change in a concentration of the catalyst in a catalyst feed stream upstream of the polymerization zone, (ii) a change in a concentration of monomer in the polymerization zone, and (iii) a change in a polymer production rate of the polymerization zone, adjusting a first catalyst flow rate of the catalyst in the catalyst feed stream to a second catalyst flow rate based on the one or a combination of (i), (ii), and (iii), and introducing the catalyst into the polymerization zone downstream of a location in the catalyst feed stream where the step of adjusting is performed. A catalyst injection system for carrying out such a process is also provided.

25 Claims, 4 Drawing Sheets

(56) References Cited

U.S. PATENT DOCUMENTS

| | | |
|---|---|---|
| 6,355,594 B1 | 3/2002 | McDaniel et al. |
| 6,420,497 B1 | 7/2002 | Kufeld et al. |
| 6,548,442 B1 | 4/2003 | McDaniel et al. |
| 6,586,544 B2 | 7/2003 | Szul et al. |
| 6,613,712 B1 | 9/2003 | McDaniel et al. |
| 6,833,415 B2 | 12/2004 | Kendrick et al. |
| 7,615,596 B2 | 11/2009 | Burns et al. |
| 7,751,941 B2 | 7/2010 | Battiste |
| 7,803,324 B2 | 9/2010 | Burns et al. |
| 8,992,840 B2 | 3/2015 | Burns et al. |
| 9,238,698 B2 | 1/2016 | Kufeld et al. |
| 2010/0227986 A1 | 9/2010 | Blackmon et al. |
| 2013/0175211 A1 | 7/2013 | Benham et al. |
| 2015/0133620 A1 | 5/2015 | Kufeld et al. |

\* cited by examiner

POLYMERIZATION CATALYST DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This disclosure relates to the delivery of catalyst and catalyst systems to a reactor; more specifically, this disclosure relates to a catalyst feeding system, and a continuous process for the delivery of catalyst; still more specifically, this disclosure relates to a polymerization catalyst feeding system, and a continuous process for the delivery of a polymerization catalyst to a polymerization reactor.

BACKGROUND

During the production of polymers (e.g., polyolefins), feed components including one or more monomer (e.g., one or more olefin monomers such as ethylene), catalyst, diluent, and other possible polymerization components (e.g., hydrogen) are typically introduced into a polymerization reactor and mixed at desired conditions of temperature, pressure, and concentration to produce a polymer (e.g., a polyolefin, for example, polyethylene) having desired properties such as a certain density and molecular weight. The various components can be separately introduced directly to the polymerization reactor; alternatively, two or more of the feed components can be combined prior to introduction to the polymerization reactor.

A challenge in the production of polyolefins is to maintain production of polyolefin with desired properties during a production run. For example, the flow rate at which polymerization catalyst components are added to a polymerization reactor can affect the physical and mechanical properties of the polyolefin produced within the polymerization reactor. Dilute phase slurry feed is often utilized for catalyst and components in a slurry loop process. A variety of catalysts may be used, such as, without limitation, chromium-based catalysts, Ziegler-Natta catalysts, metallocene catalysts, non-metallocene catalysts, phosphate alumina catalysts, nickel catalysts, and the like. Generally, the different catalyst systems require different components, and dilutions/concentrations. The catalysts are typically diluted in one or more tanks and then fed to a polymerization reactor in a known concentration. These tanks can be expensive to both install and maintain.

Polyolefin plants (e.g., polyethylene plants) often employ multiple catalysts, which increase the tank requirement. Conventional technology generally utilizes charge tanks, mix tanks, and run tanks with diaphragm slurry pumps to pump the dilute mixtures into the polymerization reactor(s) or precontactor(s). Such equipment is often massive, complex, and difficult to clean out when changing from one catalyst type or system to another. Catalyst components can be added to a polymerization reactor in a variety of ways.

For example, catalyst components may be introduced into a polymerization reactor(s) using ball check feeders, optionally in combination with mud pots. Ball check feeders typically include a rotating cylinder having a cavity on one side of the cylinder which fills with and empties catalyst components into the polymerization reactor after each 180° rotation of the cylinder. However, the amount of the catalyst components that fill the cavity during each rotation of the cylinder can vary, resulting in differing amounts of the catalyst components being fed to the polymerization reactor. Variations in concentration of catalyst result in variations in reaction rate. That is, different feed amounts of the catalyst components to the polymerization reactor can cause variances in operation and control of the polymerization reaction process occurring within the polymerization reactor, thus leading to variable production rates and the production of polyolefin with variable, undesired or less than ideal properties.

Some catalyst systems are operable via pre-contacting of the catalyst components or adjuvants, for example in a precontactor, prior to introduction into a polymerization reactor. For example, catalyst systems can comprise at least one catalyst, an activator, a support, a co-catalyst, or a combination thereof. The contact time of the catalyst components, and the consistency of contact time (e.g., the residence time in a precontactor) obtained by all of the catalyst particles, can affect process operability, catalyst performance, and product qualities.

An ongoing need thus exists for improved catalyst preparation and feeding techniques and systems therefor. Desirably, such preparation and feeding techniques and systems eliminate or reduce the conventionally-utilized mixing and dilution of catalyst upstream of a polymerization reactor or precontactor, thus eliminating or reducing the need for the charge tanks, mix tanks, and run tanks conventionally utilized; provide for more consistent contacting of catalyst components in a precontactor upstream of a polymerization reactor; or both.

SUMMARY

Disclosed herein is a process for introducing a catalyst into a polymerization zone, the process comprising: detecting one or a combination of: (i) a change in a concentration of the catalyst in a catalyst feed stream upstream of the polymerization zone, (ii) a change in a concentration of monomer in the polymerization zone, and (iii) a change in a polymer production rate of the polymerization zone; adjusting a first catalyst flow rate of the catalyst in the catalyst feed stream to a second catalyst flow rate based on the one or a combination of (i), (ii), and (iii); and introducing the catalyst into the polymerization zone downstream of a location in the catalyst feed stream where the step of adjusting is performed.

Also disclosed herein is a process for introducing a catalyst into a polymerization zone, the process comprising: detecting one or a combination of: (i) a change in concentration of the catalyst in a catalyst feed stream at a first location upstream of the polymerization zone, (ii) a change in a concentration of monomer in the polymerization zone, and (iii) a change in a polymer production rate of the polymerization zone; adjusting, at a second location upstream of the polymerization zone, a first catalyst flow rate of the catalyst in the catalyst feed stream to a second catalyst flow rate based on the one or a combination of (i), (ii), and (iii); and introducing the catalyst into the polymerization zone downstream of the first location and the second location in the catalyst feed stream.

Also disclosed herein is a process for introducing a catalyst into a polymerization zone, the process comprising: detecting one or a combination of: (i) a first concentration of the catalyst in a catalyst feed stream at a first location upstream of the polymerization zone, and a second concentration of the catalyst in the catalyst feed stream at the first location upstream of the polymerization zone, (ii) a first concentration of monomer in the polymerization zone and a second concentration of monomer in the polymerization zone, and (iii) a first polymer production rate of the polymerization zone and a second polymer production rate of the polymerization zone; comparing one or a combination of: (a) the first concentration of the catalyst to the second concentration of the catalyst to calculate an absolute value of a change in concentration of the catalyst, wherein the absolute value of the change in concentration of the catalyst is greater than a threshold catalyst concentration value, (b) the first concentration of monomer to the second concentration of monomer to calculate an absolute value of a change in concentration of monomer, wherein the absolute value of change in the concentration of monomer is greater than a threshold monomer concentration value, and (c) the first polymer production rate to the second polymer production rate to calculate an absolute value of a change in the polymer production rate, wherein the absolute value of the change in the polymer production rate is greater than a threshold production rate value; adjusting, at a second location upstream of the first location, a first catalyst flow rate of the catalyst in the catalyst feed stream to a second catalyst flow rate based on the one or a combination of (a), (b), and (c); and introducing the catalyst having a third concentration into the polymerization zone downstream of the first location and the second location in the catalyst feed stream.

Also disclosed herein is a catalyst injection system comprising: a catalyst stream; a diluent stream; and a precontactor comprising at least two mixing stages arranged in series, each of the at least two mixing stages being in continuous-stirred-tank-reactor configuration, wherein a first stage of the at least two mixing stages receives contents comprising a catalyst obtained from the catalyst stream and a diluent obtained from the diluent stream, and wherein the precontactor is configured such that greater than about 70% of the contents pass through the at least two mixing stages in one residence time of about 5 minutes to about 30 minutes.

BRIEF DESCRIPTION OF THE DRAWINGS

The detailed description will reference the drawings briefly described below, wherein like reference numerals represent like parts, unless otherwise indicated. The invention may be better understood by reference to one or more of these figures in combination with the detailed description of specific embodiments presented herein.

Figure 1:
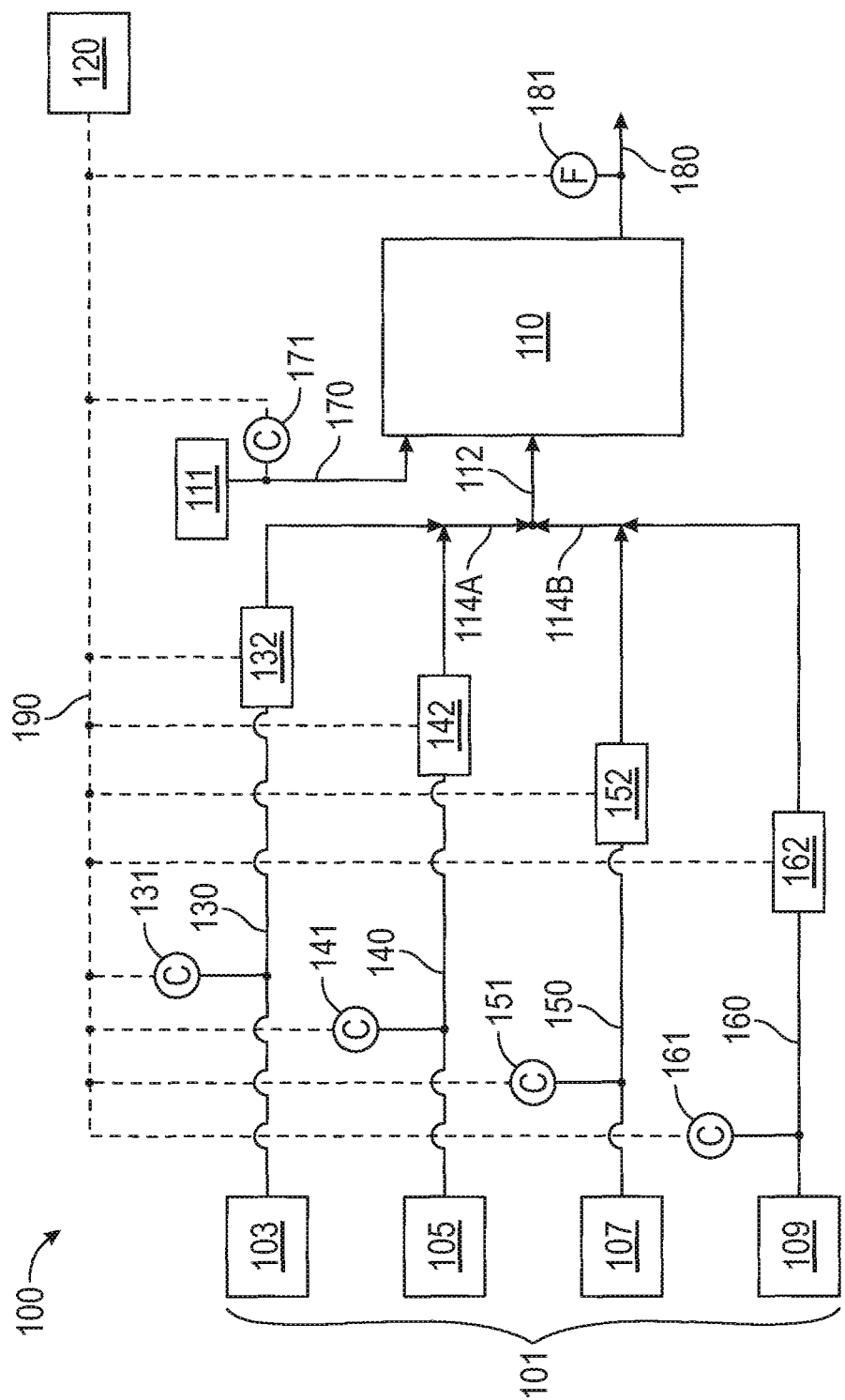
FIG. 1 illustrates a schematic of a catalyst feeding system operable for feeding a catalyst or catalyst system to a polymerization zone, according to an embodiment of this disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

Embodiments of the disclosure include systems and methods for delivery of a polymerization catalyst or a polymerization catalyst system to a polymerization zone. The disclosed embodiments allow for delivery of a variety of polymerization catalysts, for example, chromium-based catalyst, Ziegler-Natta catalyst, or metallocene catalyst, in that the disclosed system and associated methods enable the delivery of catalysts alone, in series, in combination, or as part of a catalyst system to a polymerization zone within a polymerization reactor system. In embodiments, flow is controlled by measuring the concentration of one or more catalyst components in a catalyst system feed stream and adjusting the flow rate of the one or more catalyst components in the catalyst system feed stream independent of any desired concentration of the source of the one or more catalyst components.

As noted hereinabove, conventional polymerization plants often utilize massive and complex combinations of charge tanks, mix tanks, and run tanks to prepare dilute catalyst mixtures for each catalyst system, and diaphragm slurry pumps to pump the dilute mixtures into the polymerization reactor, the precontactor, or both. Where multiple catalyst systems are used in a common reactor vessel, the amount of conventional catalyst preparation equipment is further increased. In embodiments, utilization of the herein-disclosed catalyst delivery system and method enable elimination or minimization of the need for such mixing and dilution of catalyst prior to introduction into a precontactor or polymerization reactor. According to embodiments of this disclosure, the concentration of one or more catalyst component is measured, and a flow rate thereof adjusted (i.e., increased, decreased, or maintained) in response to this measured value. Thus, according to embodiments of this disclosure, catalyst is provided to a precontactor, a polymerization reactor, or both without the need for dilution tanks, but rather via metering of the catalyst to the precontactor or polymerization reactor, measurement of the concentration, and adjustment of the flow rate thereof as necessary. In this manner, the concentration of the catalyst component may vary (unlike conventionally, where the catalyst concentration in a mix tank is generally maintained as uniformly as possible); according to embodiments of this disclosure, the absolute concentration of the catalyst component source is not important, as adjustments can be made online.

Embodiments disclosed herein also provide for the use of a precontactor for contacting catalyst components. In embodiments, the precontactor provides at least two stages within a continuous stirred-tank precontactor, such that an improved percentage of the catalyst components flows through the precontactor within one residence time before exiting the precontactor and feeding to a downstream polymerization zone.

Conventional precontactors may provide for less than ideal contact time for catalyst components, such that equilibrium is not achieved for all of the components. For example, utilization of a single continuous stirred tank reactor or 'CSTR' as a precontactor for a catalyst system results in some of the solid catalyst particles leaving the vessel prior to achieving equilibrium among the catalyst components on each solid catalyst particle. Such non-ideal mixing may be due to a broad residence time distribution, indicating that some of the components are held in the precontactor for a less than sufficient time to achieve equilibrium, while others are held in the precontactor for a more than ideal time to achieve equilibrium. The enhanced precontactor and the continuous catalyst preparation and delivery method utilizing same that are disclosed herein provide, in embodiments, a continuous way to attain a narrower residence time distribution for catalyst particles in a precontactor, whereby equilibrium among the catalyst components is more reliably achieved. In this manner, leakage of solids particles through the precontactor is reduced or minimized. Such leakage of catalyst particles is undesirable, as it may result in some fraction thereof not achieving proper equilibrium with the other catalyst components, which could lead to the downstream production of polymer with less than desired characteristics, e.g., high molecular weight gels. In embodiments, the herein-disclosed precontactor and catalyst preparation and delivery method utilizing the herein-disclosed precontactor provide the flexibility to tailor an overall residence time to the catalyst system being employed, to provide a way to control the relative concentrations of catalyst components in a catalyst system upstream of a polymerization reactor, or both.

In embodiments, the herein-disclosed precontactor comprises a modified CSTR with segmented compartments, and optionally a mixing means, a recirculation pump, a series of CSTRs (which may comprise one or more modified CSTRs of this disclosure), or a combination thereof. Without being limited by theory, the multiple compartments of the modified CSTR of this disclosure act substantially as multiple CSTRs in series, which provides a reduction in the residence time distribution relative to a single un-modified CSTR, thus enabling more optimum contact time to attain equilibrium.

Reference to a 'catalyst component' herein refers to any of a polymerization catalyst, an activator, a co-catalyst, and a diluent, which may be combined in any combination for introduction to a polymerization reactor.

Reference to 'catalyst system' herein refers to any combination of catalyst components disclosed herein. For example, a chromium-based catalyst system can include a chromium-based catalyst and a diluent; a Ziegler-Natta catalyst system can include a Ziegler-Natta catalyst, an aluminum-based co-catalyst, and a diluent; a metallocene catalyst system can include a metallocene compound, an activator, a co-catalyst, and a diluent; combination catalyst systems may comprise combinations of the foregoing (e.g., dual metallocene catalyst systems, metallocene+Zeigler-Natta, etc.).

Disclosed herein is a catalyst preparation and delivery system (also referred to equivalently herein as a "catalyst feeding system" or a "catalyst delivery system"). The catalyst delivery system will now be described with reference to FIG. 1, which illustrates a schematic of an exemplary catalyst delivery system 100 for feeding a catalyst or catalyst system to a polymerization zone 110, according to an embodiment of this disclosure. Catalyst delivery system 100 may be in fluid communication with the polymerization zone 110 and may include polymerization catalyst source 103, activator source 105, co-catalyst source 107, diluent source 109, olefin or monomer source 111, and control system 120. It should be understood that embodiments of the disclosure contemplate that one or more polymerization catalyst can be introduced from one or more polymerization catalyst source 103 to one or more polymerization zone 110. In embodiments, the one or more polymerization catalyst can be introduced without the use of an activator from activator source 105, a co-catalyst from co-catalyst source 107, or both; alternatively, one or more polymerization catalyst from one or more polymerization catalyst source 103 can be introduced to one or more polymerization zone 110 with only one selected from the activator from activator source 105 or the co-catalyst from co-catalyst source 107; alternatively, one or more polymerization catalyst from one or more polymerization catalyst source 103 can be introduced to one or more polymerization zone 110 with both an activator from activator source 105 and a co-catalyst from co-catalyst source 107. Thus, catalyst delivery system 100 can comprise any number or combination of catalyst components added via sources 101, with four (103, 105, 107, and 109) indicated in the embodiment of FIG. 1.

A catalyst feed line 130 is configured for flowing catalyst from catalyst source 103 to polymerization zone 110. A sensor 131 may be positioned on catalyst feed line 130, and configured for measuring the concentration of catalyst in catalyst feed stream 130. A flow device 132 (e.g., valve) may be positioned on catalyst feed line 130, and configured for adjusting the rate of flow of the catalyst in catalyst feed stream 130, which flows to polymerization zone 110 (e.g., via a catalyst system stream in catalyst system feed line 112).

In embodiments, catalyst delivery system 100 includes an activator feed line 140, configured for flowing the activator from activator source 105 to polymerization zone 110. A sensor 141 may be positioned on activator feed line 140, and configured for measuring the concentration of the activator in activator feed stream 140. A flow device 142 (e.g., valve) may be positioned on activator feed line 140, and configured for adjusting the rate of flow of the activator in activator feed line 140, which flows to polymerization zone 110 (e.g., via the catalyst system stream in catalyst system feed line 112).

In embodiments, catalyst delivery system 100 includes a co-catalyst feed line 150, configured for flowing the co-catalyst from co-catalyst source 107 to polymerization zone 110. A sensor 151 may be positioned on co-catalyst feed line 150, and configured for measuring the concentration of co-catalyst in co-catalyst feed stream 150. A flow device 152 (e.g., valve) may be positioned on co-catalyst feed line 150, and configured for adjusting the rate of flow of the co-catalyst in co-catalyst feed line 150, which flows to polymerization zone 110 (e.g., via the catalyst system stream in catalyst system feed line 112).

In embodiments, catalyst delivery system 100 includes a diluent feed line 160, configured for flowing the diluent from diluent source 109 to polymerization zone 110. A sensor 161 may be positioned on diluent feed line 160, and configured for measuring the concentration of diluent in diluent feed stream 160. A flow device 162 (e.g., valve) may be positioned on diluent feed line 160, and configured for adjusting the rate of flow of the diluent in diluent feed stream 160, which flows to polymerization zone 110 (e.g., via the catalyst system stream in catalyst system feed line 112).

In embodiments, catalyst delivery system 100 includes an olefin or monomer feed stream 170, configured for flowing monomer (e.g., one or more olefins such as ethylene) from a monomer source 111 to polymerization zone 110. A sensor 171 may be positioned on monomer feed line 170, and configured for measuring the concentration of the monomer in monomer feed line 170. It is contemplated that other monomer feed streams, for example, a comonomer feed stream, can be utilized in catalyst delivery system 100 for flowing a comonomer (e.g., one or more olefins such as 1-hexene) to polymerization zone 110. In alternative embodiments, sensor 171 can be placed within polymerization zone 110 for the same purpose, i.e., to measure the concentration of monomer (e.g., ethylene, co-commoner (e.g., 1-hexene), or both therein.

Catalyst delivery system 100 comprises control system 120, configured to measure and control, via signal lines 190, one or more of a change in the concentration of catalyst in catalyst feed line 130 sensed by sensor 131, a change in the concentration of activator in activator feed line 140 sensed by sensor 141, a change in the concentration of co-catalyst in co-catalyst feed line 150 sensed by sensor 151, a change in the concentration of diluent in diluent feed line 160 sensed by sensor 161, a change in the concentration of monomer in polymerization zone 110 sensed by sensor 171, a change in the polymer production rate, which may be determined by the flow rate measured in product line 180 via flow sensor 181, or both, and send a signal to one or more of flow device 132 (e.g., valve) to adjust the catalyst flow rate in catalyst feed line 130, flow device 142 (e.g., valve) to adjust the activator flow rate in activator feed line 140, flow device 152 (e.g., valve) to adjust the co-catalyst flow rate in co-catalyst feed line 150, and flow device 162 (e.g., valve) to adjust the diluent flow rate in diluent feed line 160.

Process control system 120 can be used to insure uniform concentrations, feed amounts and ratios. These control systems can comprise supervisory control and data acquisition (SCADA), programmable logic controllers (PLC), or distributed control systems (DCS), that can gather and transmit data that is obtained during the process. Control system 120 can be a relatively simple item that can have a sensor, often called a primary transducer, that receives an input, a controller that processes the input, and a receiver that processes an output. The control system makes adjustments in the process variables based on at least one input. A response is then generated to make sure the system remains near set point. The response can be a valve opening to increase or decrease the flow of a component. The control system not only works to insure the process variable remains at set point, but to minimize the variation in the process variable.

Polymerization zone 110 can be any reactor system suitable for carrying out a polymerization process to produce a desired polymer (e.g., polyolefin) product. Reactor systems can include one or more of a slurry loop reactor, a gas phase reactor, an autoclave reactor, a batch reactor, or a continuous-stirred tank reactor, for example. Polymerization zone 110 may be configured to produce a polyolefin. The polyolefin produced by polymerization zone 110 can be a low density polyethylene (LDPE), a linear low density polyethylene (LLDPE), a medium density polyethylene (MDPE), a high density polyethylene (HDPE), or a combination thereof. Examples of polyethylene polymerization processes can be found in U.S. Pat. Nos. 3,248,179, 5,565,175, 5,575, 979, 6,239,235, 6,833,415, and 9,238,698, each of which is incorporated by reference in its entirety for all purposes not contrary to this disclosure. In embodiments, polymerization zone 110 comprises a slurry loop reactor, as described in greater detail, for example, in U.S. Pat. Nos. 6,420,497; 6,239,235; 5,565,175; 5,565,174; 5,455,314; and 4,613,484, the disclosure of each of which is herein incorporated in its entirety by reference for all purposes not contrary to this disclosure. Polymerization zone 110 may comprise any reactor unit in which a polymerization reaction can occur such as, for example, a continuous stirred tank reactor (CSTR), a slurry loop reactor, a batch reactor, a gas phase reactor, an autoclave reactor, a tubular reactor, a multi-zone reactor, a fluidized bed reactor, a fixed bed reactor, a stirred bed reactor, or a stirred fluidized bed reactor. In an embodiment, polymerization zone 110 comprises or is a slurry loop reactor. Other suitable types of reactors will be apparent to those of skill in the art, and are to be considered within the scope of the disclosure.

When a slurry loop reactor is used, polymerization zone 110 can be a loop of pipe having a nominal outside diameter of between 12 and 36 inches. Polymerization zone 110 can be oriented horizontally or vertically. Polymerization zone 110 can have any number of reactor legs, such as between 2 and 16 legs; alternatively, between 2 and 12 legs; alternatively, between 2 and 8 legs; or alternatively, between 2 and 6 legs. The volume of polymerization zone 110 is not limited by this disclosure. In embodiments, the volume of polymerization zone 110 ranges from about 1,000 gallons to about 80,000 gallons. In embodiments, the contents within polymerization zone 110 are circulated throughout polymerization zone 110 in the form of a slurry. The slurry may include one or more of the following: a hydrocarbon, a diluent, a catalyst, and a polymer. The slurry can be circulated by a motivating device (not shown). The motivating device can be any device suitable for circulating the slurry throughout polymerization zone 110 such as, by way of non-limiting example, an axial flow pump, a mixed flow pump, a centrifugal pump, a positive displacement pump, or any combination thereof. In embodiments, the motivating device is one or more axial flow pumps. Homopolymers and co-polymers of polyolefins, such as polyethylene and polypropylene, can be produced in polymerization zone 110. Variables important to the operation of polymerization zone 110 can be monitored and controlled by an interface. Common interfaces include DCS (distributed control system), PLC (programmable logic controller), and a Neural Network. Variables important to reactor operation include, without limitation, production rates, catalyst feed rates, temperatures, pressures, flow rates, concentrations, and the like. For example, residence time in polymerization zone 110 can be limited to a predefined time, and the solids concentration for each component can be maintained. Operating conditions can include, but are not limited to, residence time, temperature, pressure, chemicals concentration, solids concentration, and combinations thereof. Maintaining relatively high reactor solids concentration and increasing polymer (e.g., polyethylene) production due to consistent catalyst preparation and feeding according to this disclosure can improve the operation of polymerization zone 110. For example, and without limitation, residence time within polymerization zone 110 can be controlled to within a range of approximately 20 minutes to 3 hours, temperature can be controlled to within a range of about 150° F. to about 230° F. (66° C.-110° C.), pressure can be controlled to within a range of approximately 500 pounds per square inch (psi) to about 800 psi (3.5 MPa-5.5 MPa), and solids concentration can be controlled to within a range of approximately 30 weight percent to about 75 weight percent.

In embodiments, catalyst delivery system 100 includes at least two polymerization zones or reactors 110. In embodiments, the polymerization reactors 110 are arranged in a series configuration. In embodiments, the polymerization reactors 110 are arranged in a parallel configuration.

In embodiments, components from sources 103, 105, 107, 109, or a combination thereof are introduced individually to polymerization zone 110. In alternative embodiments, one of more of the components from 103, 105, 107 and 109 are combined prior to introduction into polymerization zone 110. For example, in the embodiment of FIG. 1, catalyst feed line 130 and activator feed line 140 combine to provide line 114A; diluent feed line 160 and co-catalyst feed line 150 combine to provide line 114B; and lines 114A and 114B are combined to provide catalyst system feed line 112, which introduces the catalyst system into polymerization zone 110.

In embodiments, a pump is positioned on one or more of line 130, 140, 150, 160, 170, and 180. The pump can be any pump suitable for flowing the respective components at rates suitable for introduction into (i.e., for lines 130, 140, 150, 160, 170) or extraction from (i.e., for line 180) polymerization zone 110. In embodiments, the pump is a positive displacement-type pump. In embodiments, the pump is a syringe pump.

A flow meter 181 can be positioned on polymer product line 180, and configured to measure the flow of the polymer product (e.g., polyolefin) flowing from polymerization zone 110. Flow meter 181 can be any flow meter suitable for precisely measuring the polyolefin flow (e.g., optionally in a slurry form withdrawn from a slurry loop reactor), such as, for example, a thermal mass flow meter or a volumetric flow meter such as an orifice-type, diaphragm-type, or a level-type meter. In some embodiments, the flow meter is a mass flow meter. More specifically, in some embodiments, the flow meter is a coriolis-type meter adapted to measure a variety of flow types from a positive displacement-type pump. Flow exiting the polymerization zone 110 via product line 180 may be controlled via a flow device (e.g., valve) positioned within line 180 and in signal communication with control system 120.

Figure 2:
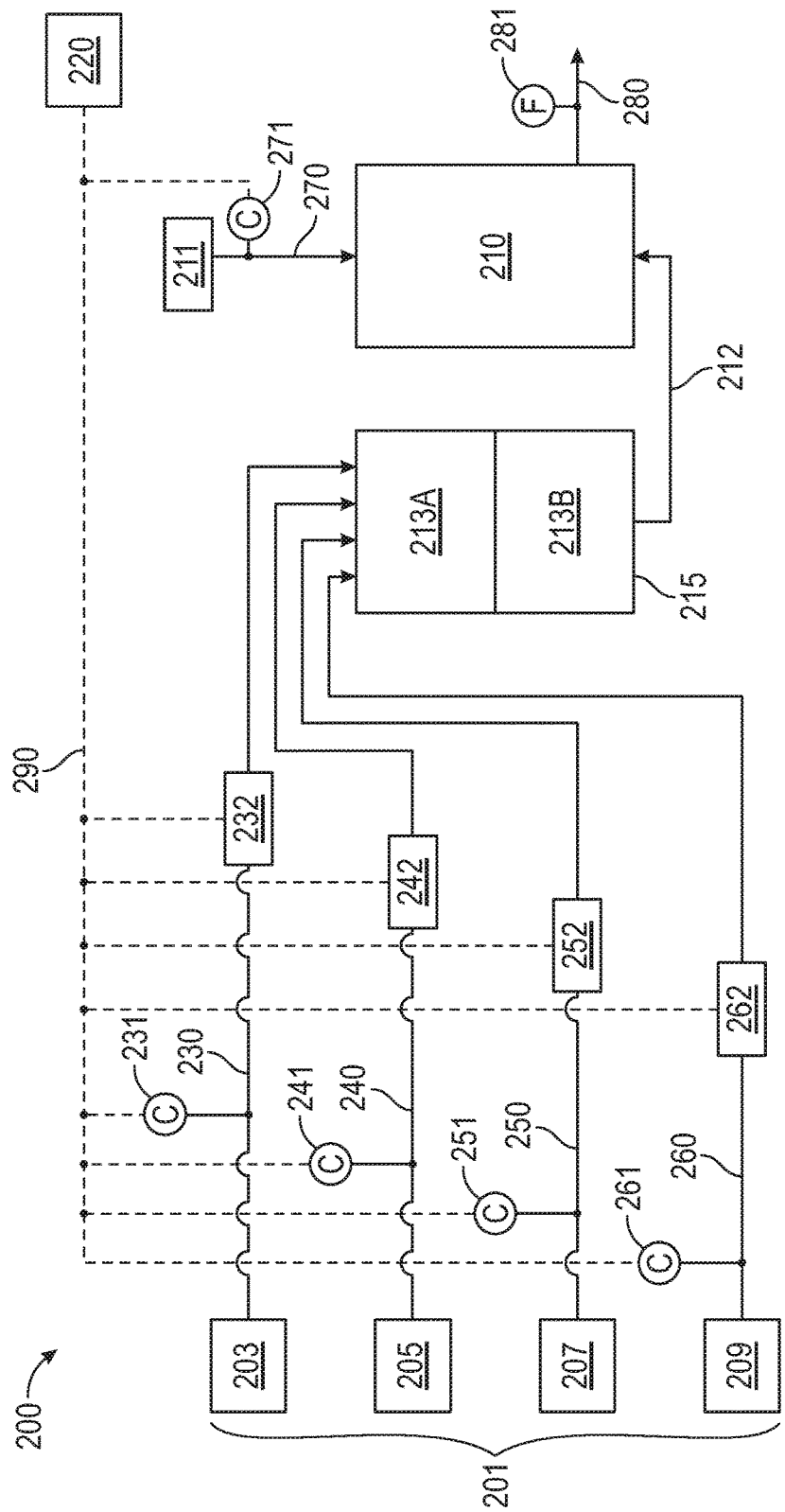
FIG. 2 illustrates a schematic of a catalyst feeding system operable for feeding a catalyst or catalyst system to a polymerization zone, according to further embodiment of this disclosure which utilizes a precontactor.

FIG. 2 illustrates a catalyst delivery system 200, according to another embodiment of this disclosure. Catalyst delivery system 200 includes a precontactor 215. Corresponding numbers are used for corresponding features in FIGS. 1 and 2 (i.e., polymerization reactor 110 of FIG. 1 corresponds with polymerization reactor 210 of FIG. 2), and the components of catalyst delivery system 200 are the same as those delineated with regard to catalyst delivery system 100, with the addition of precontactor 215.

Precontactor 215 is designed to contact one or more selected components prior to introducing the selected components into polymerization zone 210. The selected components that are introduced to precontactor 215 are chosen from the polymerization catalyst in catalyst feed line 230, the activator in activator feed line 240, the co-catalyst in co-catalyst feed line 250, the diluent in diluent feed line 260, and combinations thereof, and can include any amount of any of these components from sources 201, e.g., sources 203, 205, 207, or 209.

Precontactor 215 can be any type of vessel suitable for contacting the one or more selected components in lines 230, 240, 250, and 260, prior to introducing the selected components into polymerization zone 210. By way of non-limiting example, precontactor 215 may comprise at least one of a continuous stirred tank reactor (CSTR) and a plug flow reactor. Precontactor 215 can contain an agitator (not shown) for mixing the one or more selected components from feed lines 230, 240, 250, and 260 together or otherwise agitating the one or more selected components introduced via feed lines 230, 240, 250, and 260. The agitator can include, but is not limited to, one or more impellers, a rotating element, a mixer, a vibrating device, or any combination thereof.

In embodiments, precontactor 215 is a continuous stirred tank reactor (CSTR). When precontactor 215 is a CSTR, the selected components are mixed with the assistance of the agitator. The contents (i.e., the selected components combined in precontactor 215) have a residence time distribution (rtd) within precontactor 215. For example, in a typical single CSTR, the decay rate is about 60% to about 70% complete at one residence time, about 80% to about 90% complete at two residence times, and about 92% to about 98% complete at three residence times. In other words, about 60% to about 70% of the contents in precontactor 215 remain for ±one residence time; about 80 to about 90% remain for ±two residence times; and about 92 to about 98% for ±three residence times. Alternatively, the decay rate can be about 62% to about 65% at one residence time, about 85% to about 87% for two residence times, and about 94% to about 96% at three residence times. Multiple CSTRs can give a narrower residence time distribution. For example, infinite CSTRs in series simulate the rtd as in a batch reactor. In embodiments, precontactor 215 comprises two, three, four, or more CSTRs in series.

In embodiments, precontactor 215 is a plug flow type vessel. The particles within a plug flow type reactor 215 all have approximately the same residence time with little or no lateral mixing. In embodiments, precontactor 215 includes at least one plug flow type vessel and at least one CSTR arranged in series. One skilled in the art will recognize that other arrangements are possible with single or multiple CSTRs and plug flow reactors, and are included in the scope of the disclosure. For example, precontactor 215 can be a CSTR, a plug flow reactor, two or more CSTRs in series, a CSTR followed by a plug flow reactor, a plug flow reactor followed by a CSTR, or any other combination thereof.

In embodiments, precontactor 215 is an enhanced precontactor comprising a modified CSTR, according to this disclosure. Such a modified CSTR is described in further detail hereinbelow. Such a modified CSTR may comprise a plurality of compartments or zones, such as zones 213A and 213B depicted in the embodiment of FIG. 2.

Operating conditions for precontactor 215 can be monitored and controlled. Predefined amounts of selected components from sources 203, 205, 207, and 209 introduced into precontactor 215 can be monitored and controlled prior to introduction into precontactor 215, and any mixing or agitation of the selected components can be controlled within a range of selected conditions. Factors that can be controlled in precontactor 215 include residence time, temperature, pressure, concentration, and combinations thereof, of the one or more selected components. Control of these factors can affect the properties of the polymer (e.g., the polyolefin) produced downstream within polymerization zone 210.

Residence time, which can also be referred to as contact time, within precontactor 215 can be controlled, for example, by controlling the rate of flow of diluent introduced via line 260 into precontactor 215. The residence time within precontactor 215 can be any amount of time suitable for thoroughly contacting the one or more selected components, such as, for example, from about 1 second to about several hours. In some embodiments, the residence time ranges from about 1 second to about 300 minutes; from about 1 second to 200 minutes; from about 1 second to about 100 minutes; from about 1 second to about 60 minutes; from about 1 second to about 30 minutes; from about 1 minute to about 30 minutes; from about 5 minutes to about 60 minutes; from about 5 minutes to about 30 minutes; or from about 5 minutes to about 15 minutes.

The residence time in precontactor 215 can be adjusted prior to introduction of the selected components to polymerization zone 210, in response to product performance, reactor operability, etc. Control of polymerization zone 210 and the quality of the polyolefin product can be improved as a result of the increased precision in measurement and control of catalyst fed to polymerization zone 210 via the disclosed catalyst delivery system and method described herein. In embodiments, the selected components can completely or partially bypass precontactor 215 to increase precision and control of the catalyst feed and effectively operate similarly to catalyst delivery system 100 of FIG. 1. In other cases superior catalyst and product performance can be achieved by contacting some or all of the selected components prior to introduction into polymerization zone 210 as previously described.

When a plug flow precontactor is used, the streams entering precontactor 215 can enter at different locations in precontactor 215. Some selected components introduced via feed line(s) 230, 240, 250, and 260 can enter at the front or the beginning of precontactor 215, and others can be spaced throughout the length of precontactor 215. By staging the selected components throughout a plug flow precontactor 215, the residence time of each selected component can be tailored for product performance. By way of non-limiting example, one method can be to add one or multiple catalyst components via a catalyst feed line 230 at the entrance of the plug flow precontactor 215, and add an activator via activator feed line 240, a co-catalyst via co-catalyst feed line 250, or both downstream of the entrance of the plug flow precontactor 215. Polymerization catalyst, activator, co-catalyst, or a combination thereof can remain in precontactor 215 from less than one second to several hours before contacting the other selected components. As another example, polymerization catalyst introduced via catalyst feed line 230 can be staged with an activator via activator feed line 240, followed by polymerization catalyst via catalyst feed line 230, followed by a co-catalyst via co-catalyst feed line 250, followed by polymerization catalyst via catalyst feed line 230, and then followed by the same or a different co-catalyst via co-catalyst feed line 250.

Many methods may be employed to control the temperature in precontactor 215, including by direct or indirect heating. As well known to those of skill in the art, temperature control can be an important factor in chemical reactions. Because of the different reaction rates, paths, and diffusivities that vary with reaction temperature, the reaction temperature may be held relatively constant to consistently produce reaction products having similar properties. Suitable techniques for controlling the temperature within precontactor 215 will be apparent to those of ordinary skill in the art, and are to be considered within the scope of this disclosure.

The concentrations of the selected components in precontactor 215 can be varied and adjusted to affect the reaction, the product quality, the reactor operation, etc. The reaction rate can be affected by having a higher or lower concentration of one or more of the selected components in precontactor 215. A certain ratio of selected components in precontactor 215 may provide for optimal catalyst performance, product quality, and reactor operability. Furthermore, a ratio of one or more of the selected components introduced into precontactor 215 via line 230, 240, 250, and 260 in relation to the feed directly to the polymerization zone 215 (i.e., feed that doesn't pass through precontactor 215) can affect the reactor operability. The reaction extent can be affected by having a higher or lower concentration of one or more of the selected components in precontactor 215. The efficiencies of the components can be affected by having a higher or lower concentration of some or all of the selected components introduced via line 230, 240, 250, and 260 in precontactor 215.

Catalyst delivery system 200 of FIG. 2 may further comprise one or more of sensors 231/241/251/261, flow devices 232/242/252/262, monomer source 211, catalyst system stream 212, control system 220, monomer feed line 270, sensor 271, product outlet line 280, flow meter 281, and signal line 290 which, as noted hereinabove, may be as described with reference, respectively, to like numbered sensors 131/141/151/161, flow devices 132/142/152/162, monomer source 111, catalyst system stream 112, control system 120, monomer feed line 170, sensor 171, product outlet line 180, flow meter 181, and signal line 190 of the embodiment of FIG. 1.

Also disclosed herein is an enhanced precontactor. In embodiments, a catalyst delivery system of this disclosure comprises the herein-disclosed enhanced precontactor. For example, an enhanced precontactor as described hereinbelow may be utilized as precontactor 215 of catalyst delivery system 200 of FIG. 2. Alternatively, an enhanced precontactor 315 may be utilized in any conventional catalyst delivery system known to those of skill in the art.

The herein-disclosed enhanced precontactor comprises two or more CSTRs arranged in series; a modified CSTR which comprises a single continuous stirred tank mixer vessel containing internally segmented compartments, each of which may act substantially as a single CSTR and together as a series CSTR combination; a recirculation pump configured for returning excess pumpage back into the precontactor (i.e., back into a first compartment of the modified CSTR or back into a first CSTR in a series of CSTRs), or a combination thereof. Such a modified CSTR may enable minimization of leakage of solid particles to adjacent compartment(s) without experiencing the full residence time effect within each compartment. In embodiments, the modified CSTR comprises a CSTR vessel of sufficient volume to achieve substantially complete equilibrium of catalyst components and final catalyst. Such a modified CSTR may be a segmented and baffled tank, configured such that substantially all of the particles reach equilibrium prior to exiting the vessel. Such a modified CSTR may contain mixing means, such as paddles, operable to accommodate various levels within the vessel in order to provide different residence times, as desired for various catalyst systems.

A modified CSTR 315 will now be described with reference to FIG. 3, which illustrates a schematic of a catalyst preparation and delivery system 300 according to an embodiment of this disclosure. Catalyst preparation and delivery system 300 comprises enhanced precontactor/modified CSTR 315. In embodiments, enhanced precontactor 315 comprises baffles or other internals 318 configured to segment the interior of CSTR 315 into a plurality of compartments. Desirably, the compartments are configured such that each compartment acts as a single CSTR, and the plurality of compartments together serve to operate as a CSTR series. As noted hereinabove, and without wishing to be limited by theory, such a design may allow for minimal leakage of solid catalyst particles from one compartment to any of the adjacent compartments prior to substantially all of the particles experiencing the full residence time effect. In this manner, modified CSTR 315 may provide for a narrower residence time distribution than a conventional CSTR. As noted hereinabove, in a typical single conventional CSTR, the decay rate is about 60% to about 70% complete at one residence time, about 80% to about 90% complete at two residence times, and about 92% to about 98% complete at three residence times. In other words, about 60% to about 70% of the contents in a single, conventional CSTR remain for ±one residence time; about 80 to about 90% remain for ±two residence times; and about 92 to about 98% for ±three residence times. In embodiments, utilization of an enhanced precontactor or modified CSTR 315 according to this disclosure provides for a narrower residence time distribution. For example, in embodiments, utilization of an enhanced precontactor (e.g., a series of two or more CSTRs, a modified (i.e., segmented) CSTR according to this disclosure, a precontactor configured with a recirculation pump, or a combination thereof) allows for greater than or equal to about 70%-100% (inclusive, that is, including greater than or equal to about 71%, 72%, 73%, 74%, 75%, . . . , 80%, . . . 85%, . . . , 100%) of the contents to remain in the enhanced precontactor for a residence time within ±one residence time.

An enhanced precontactor according to this disclosure may comprise a modified CSTR according to this disclosure, a series comprising two or more CSTRs selected from conventional CSTRs and the herein-disclosed modified CSTRs, or both. Such an enhanced precontactor may further comprise a recirculation pump, as noted hereinabove. For example, in the embodiment of FIG. 3, catalyst preparation and delivery system 300 further comprises catalyst slurry recirculation pump 345, fluidly connected with an outlet of enhanced precontactor 315 via active catalyst outlet line 344. Recirculation pump 345 is configured to provide active catalyst to one or more reactor feed slurry pumps, and thus to one or more polymerization reactors. For example, in the embodiment of FIG. 3, recirculation pump 345 provides active catalyst from active catalyst outlet line 344 to first reactor slurry pump 321A, and second slurry pump 321B, via first slurry line 346A and second slurry line 346B, respectively. First reactor slurry pump 321A, and second reactor slurry pump 321B are configured to introduce active catalyst into first polymerization reactor 310A and second polymerization reactor 310B, respectively. Flow control devices 322A and 322B (e.g., valves) may be provided to control flow of active catalyst in first catalyst system feed line 312A and second catalyst system feed line 312B, respectively. Catalyst slurry recirculation pump 345 is also configured to recycle active catalyst to the precontactor. For example, in the embodiment of FIG. 3, catalyst slurry recirculation pump 345 is configured to recycle active catalyst from active catalyst outlet line 344 to enhanced precontactor 315 via catalyst slurry recycle line 346C. Modified CSTR 315 may further comprise a mixing component 316 configured to agitate the contents therein. In embodiments, mixing component 316 comprises paddles 317, wherein each compartment within the CSTR 315 has at least one paddle disposed therein to mix the contents thereof. Catalyst preparation and delivery system 300 may further comprise a solids analyzer 355 configured to determine the solids content within catalyst recycle line 346C, and a flow control device 372 (e.g., valve) positioned on catalyst recycle line 346C, and configured to control the flow thereof.

A catalyst or catalyst system may be introduced to modified CSTR 315 as known in the art, or via the catalyst delivery system and method described herein. For example, in embodiments, the catalyst preparation and delivery system comprises a dilute slurry feeder or a mudpot feeder system configured to maintain a stable solids concentration within the enhanced precontactor based on a solids content measured with solids analyzer 355. In embodiments, a catalyst and delivery system of this disclosure comprises a dilute slurry feeder system to provide make-up solids to the precontactor. In embodiments, a catalyst and delivery system of this disclosure comprises a conventional single mudpot system to provide make-up solids to the precontactor. In embodiments, a catalyst preparation and delivery system of this disclosure comprises a stacked mudpot system to provide make-up solids to the precontactor. For example, catalyst preparation and delivery system 300 of FIG. 3, comprises a mudpot solids make-up system 325, comprising a first mudpot 335A and a second (stacked) mudpot 335B. Mudpot system 325 may be a conventional mudpot system as known to those of skill in the art. Mudpot system 325 may further comprise a diluent source 309B (e.g., for supplying a diluent such as isobutane), a flow control device 362B (e.g., valve) configured to control the flow of diluent into the first and second mudpots via diluent line 363 and first and second diluent lines 363A and 363B, respectively. Mudpot system 325 may further comprise a catalyst feeder 336, which may be, in embodiments, a rotary or PTO type valve or ball check valve as known to those of skill in the art. Mudpot solids make-up system 325 may further comprise a shutoff valve 337, configured to cease flow of catalyst from the mudpot(s) when desired, for example during shutdown or in the event catalyst feeder 336 malfunctions. Solids analyzer 355 may send a signal 356 to catalyst feeder 336, to control the flow of dilute catalyst from mudpot solids make-up system 325 and help maintain a desired solids level in enhanced precontactor 315.

In embodiments, a stacked mudpot system could be incorporated within catalyst preparation and delivery system 300, to provide for make-up of solids to the enhanced precontactor 315. Such a stacked mudpot system could allow for continuing to charge and feed the solid catalyst without changing feeders, or could provide a method for switching solid catalyst types.

In embodiments, a catalyst preparation and delivery system of this disclosure comprises a weighed catalyst tote bin system to provide make-up solids (as a dry feed) to the precontactor. For example, catalyst preparation and delivery system 300 of FIG. 4, comprises a weighed catalyst tote bin solids make-up system 325'. Catalyst preparation and delivery system 300 of FIG. 4 is the same as that of FIG. 3, with the replacement of mudpot solids make-up system 325 of FIG. 3 with the weighed catalyst tote bin solids make-up system 325' of FIG. 4.

Weighed catalyst tote bin solids make-up system 325' may comprise a weigh feeder. Such weigh feeders include, without limitation, weigh feeders available from ACRISON® (Moonachie, N.J.). In embodiments, weighed catalyst tote bin solids make-up system 325' comprises a weighed catalyst tote bin 364, and a wall mounted scale 367. Weighed catalyst tote bin solids make-up system 325' is operable such that gravity and a weigh feeder are utilized to add dry, free-flowing, granular catalyst in a measured and controlled rate from catalyst tote bin 364 to liquid containing precontactor 315. Catalyst tote bin 364 may be at a lower pressure (e.g., approximately 20 psig (137.9 kPa), as measured with pressure gauge PG 365) than precontactor 315 (which may be at about 60 psig (413.7 kPa) to 100 psig (689.5 kPa), in embodiments). Precontactor 315 contains liquid (e.g., diluent, such as, without limitation, isobutane ($IC_4$)) and a possible variety of other adjuvants (303, 305, 307, or a combination thereof). Flow controller 309A may be utilized to indicate the diluent flow to catalyst flow controller 368, which may respond by cycling the valve operation of valves 336' and 337', in order to obtain a (369 measured loss in weight feeder) ratio of the catalyst solids to diluent to achieve a steady catalyst slurry concentration (e.g., 1.5 wt. % for ZN catalyst, 4.5 wt. % for metallocene catalyst, or 10 wt. % for particle form (e.g., chromium) catalyst). Valves 336' and 337' may be, in embodiments, high cycle Teflon sealed ball valves.

Catalyst slurry concentration may, in embodiments, be verified and fine-tuned by comparing against a solids concentration obtained from mass flow meter 372. In embodiments, a smaller loss weight feeder is positioned intermediately between tote bin 364 and precontactor 315 in order to achieve a desired accuracy and control, as the flow rate may be in the range of pounds per hour, and tote bin 364 may weigh several thousand pounds. In embodiments, smaller metering valves, nitrogen flow assist 374, or both are employed for difficult-to-flow catalysts. In embodiments, multiple apparatus 325' are arranged in order to feed multiple dry catalysts to precontactor 315 simultaneously.

In embodiments, catalyst preparation and delivery system 300 further comprises one or more adjuvant lines and flow control devices (e.g., valves) configured to introduce one or more catalyst or catalyst system components or adjuvants to enhanced precontactor 315. Such adjuvants may comprise catalyst, activator, co-catalyst, diluent, or some combination thereof. For example, in the embodiment of FIG. 3 and FIG. 4, catalyst preparation and delivery system 300 comprises: catalyst or first adjuvant source 303, which is fluidly connected with enhanced precontactor 315 via catalyst or 'first adjuvant' feed line 330; activator or 'second' adjuvant source 305, which is fluidly connected with enhanced precontactor 315 via activator or 'second adjuvant' feed line 340; co-catalyst or third adjuvant source 307, which is fluidly connected with enhanced precontactor 315 via co-catalyst or 'third adjuvant' feed line 350; and diluent source 309A (e.g., for supplying a diluent such as isobutane), which is fluidly connected with enhanced precontactor 315 via diluent feed line 360A. Flow control devices 332, 342, 352, and 362A (e.g., valves) may be positioned on lines 330, 340, 350, or 360A, respectively, to control the flow therethrough. As indicated in the embodiment of FIG. 3 and FIG. 4, one or more of the catalyst and catalyst components introduced via lines 330, 340, 350, 360A, and 360B may be combined (e.g., into line 314) prior to introduction into enhanced precontactor 315. Alternatively, similar to the embodiment of FIG. 2, one or more of the components (e.g., the diluent) may be added directly to enhanced precontactor 315, without being pre-combined with any of the other components or adjuvants.

Figure 3:
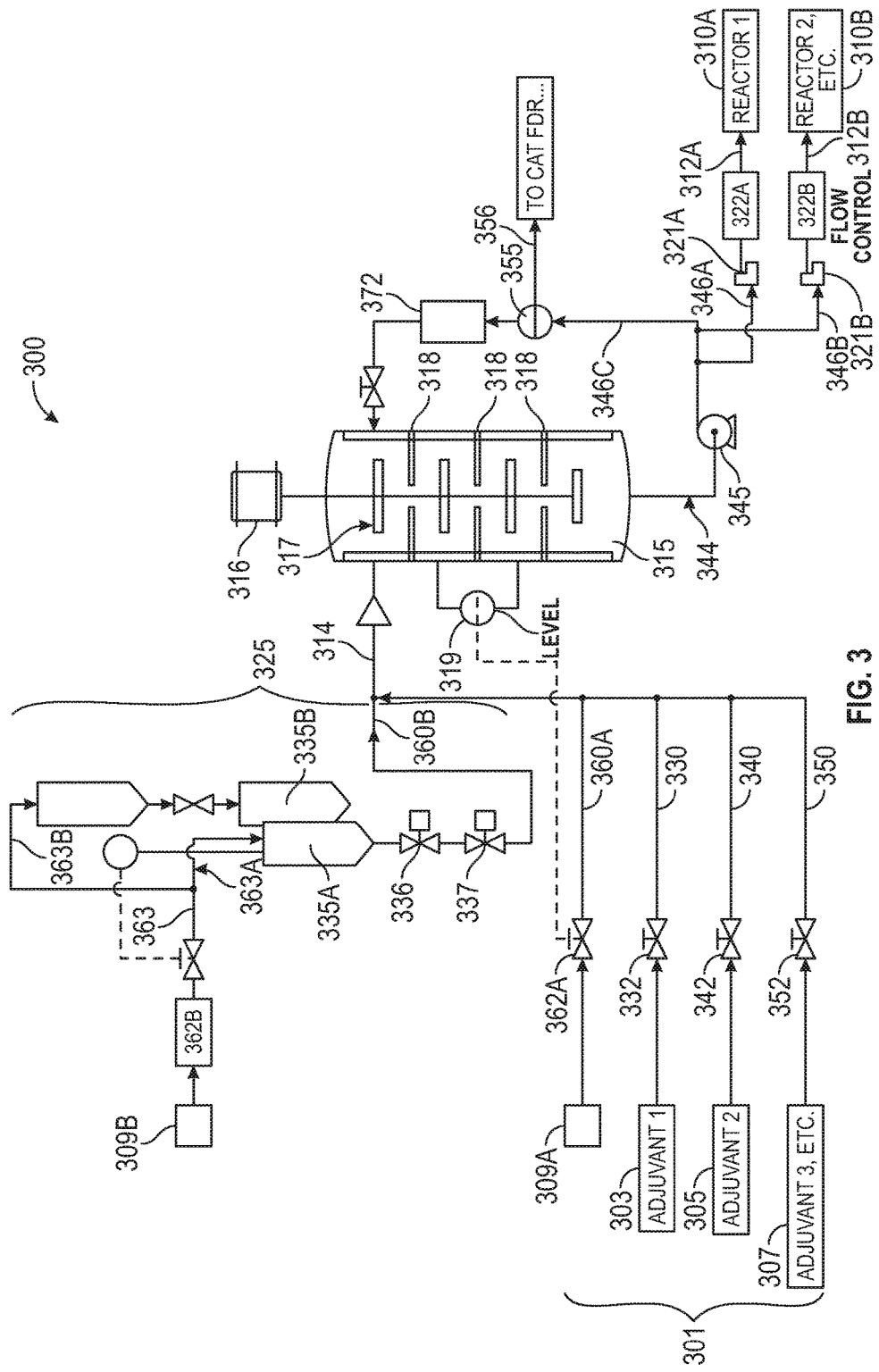
FIG. 3 illustrates a schematic of a catalyst preparation and delivery system according to an embodiment of this disclosure.
Figure 4:
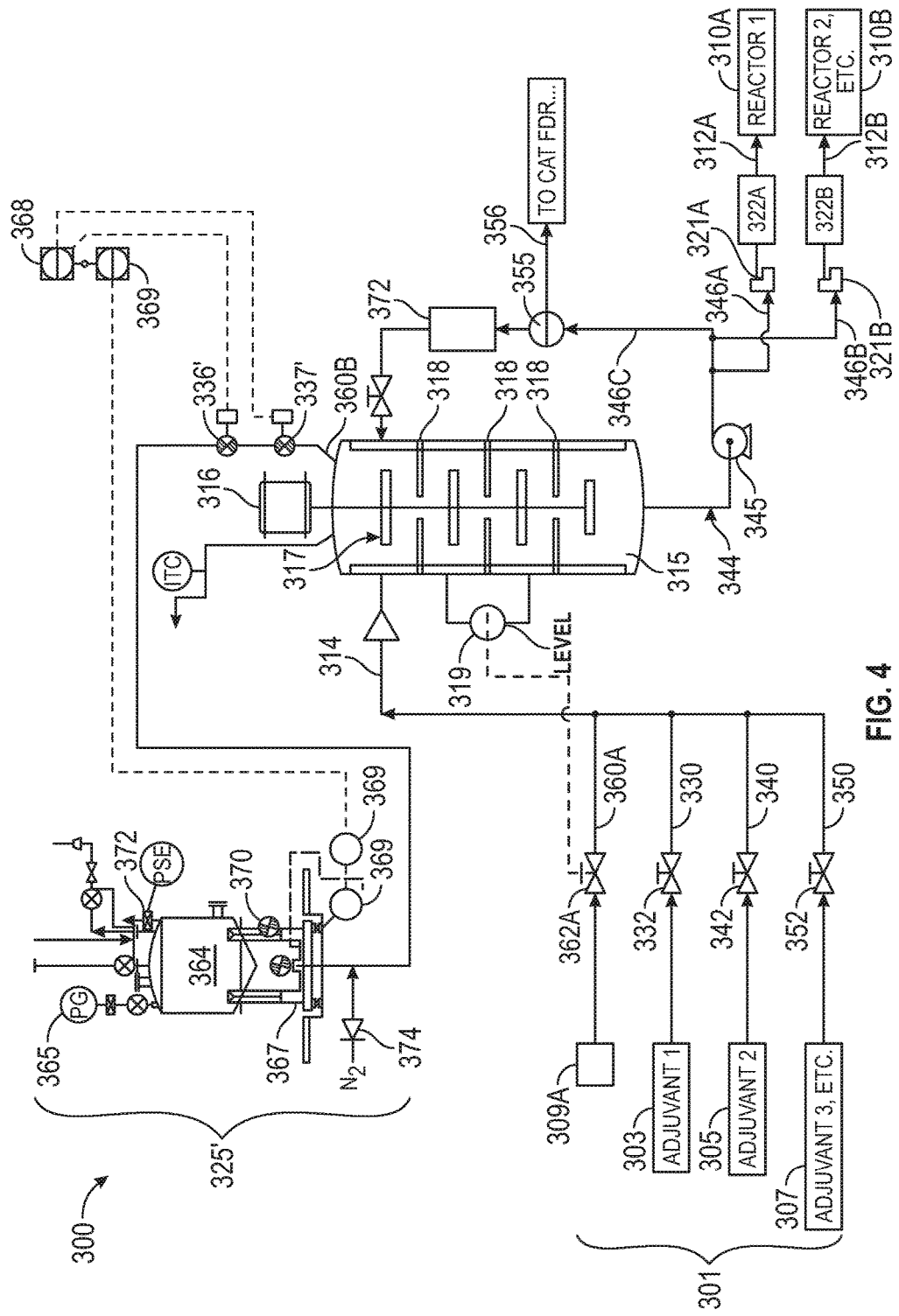
FIG. 4 illustrates a schematic of a catalyst preparation and delivery system according to a further embodiment of this disclosure.

In embodiments, catalyst preparation and delivery system of this disclosure may be substantially as shown in the embodiment of FIG. 3 or FIG. 4, without mudpot system 325 or catalyst tote bin system 325', respectively. That is, catalyst and catalyst components may be introduced as described hereinabove with regard to FIGS. 1 and 2 via lines 330, 340, 350, and 360A. In such embodiments, sensors may be positioned on catalyst or first adjuvant line 330, activator or second adjuvant line 340, co-catalyst or third adjuvant line 350, diluent line 360A, or a combination thereof, and configured for measuring the concentration therein as discussed in relation to FIGS. 1 and 2. Based on the measured concentration reading for that component, the flow thereof may be maintained, increased, or decreased, as described hereinabove. In such a manner, as noted above, the need for mixing and dilution tanks may be reduced or eliminated.

Catalyst preparation and delivery system 300 may further comprise a level indicator 319 configured to assess the fluid level within enhanced precontactor 315 and send a signal to flow control device 362A, whereby flow of diluent may be increased, decreased, or maintained as necessary to maintain a desired fluid level within enhanced precontactor 315. In this manner, the fluid level in enhanced precontactor 315 can be maintained via a continuous flow of diluent to the vessel, sweeping past the catalyst feeder. In embodiments, other liquid components of the catalyst system are fed to the enhanced precontactor 315 based on flow calculations to maintain a concentration within the diluent and solids inventory of the CSTR vessel and pump-around (i.e., recirculation) loop. The CSTR level may be maintained at a certain target value to ensure adequate overall residence time to achieve a desirable equilibrium of the catalyst components onto the solid particles, to create a headspace which can be used to vent any inerts introduced in the system, or both.

Without limitation, a modified precontactor of this disclosure may be particularly suitable for systems involving multiple catalyst systems. For example, a modified CSTR precontactor 315 may be particularly well adapted for use in systems employing multiple metallocene catalyst systems.

The polymerization catalyst introduced via line(s) 130/230/330 is provided to catalyst delivery system 100/200/300 as the active compound for a polymerization catalyst. In embodiments, catalyst delivery system 100/200/300 comprises up to 6 different polymerization catalyst components introduced via one or more catalyst feed line(s) 130/230/330. The different polymerization catalyst components may be staged with the same or different co-catalyst compounds introduced via one or more co-catalyst feed line(s) 150/250/350. In embodiments, the co-catalyst components are introduced downstream of the polymerization catalyst components. Alternatively, catalyst delivery system 100 may comprise up to four different polymerization catalyst components. Alternatively, catalyst delivery system 100/200/300 can comprise up to three different polymerization catalyst components. Those skilled in the art will recognize other applications in accordance with various embodiments.

In embodiments, the polymerization catalyst is any catalyst component suitable for olefin polymerization, such as, by way of non-limiting example, a chrome oxide catalyst, a chrome silyl catalyst, a Zeigler-Natta catalyst, a metallocene catalyst, a phenoxyimine catalyst, and a phosphated aluminum catalyst. In embodiments, the composition of the catalyst in catalyst source 103/203/303 can include an additional compound such as titanium. In an exemplary embodiment, the polymerization catalyst is a metallocene solution. In some aspects, the polymerization catalyst is a metallocene solution having the following general equation:

$$(X(1))(X(2))(X(3))(X(4))M(1). \qquad (1)$$

In this equation, M(1) is selected from the group consisting of titanium, zirconium, and hafnium. (X(1)) is independently selected from the group consisting of cyclopentadienyl, indenyls, fluorenyls, substituted cyclopentadienyls, substituted indenyls, and substituted fluorenyls. Substituents on the substituted cyclopentadienyls, substituted indenyls, and substituted fluorenyls of (X(1)) are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, hydrogen, and combinations thereof. At least one substituent on (X(1)) can be a bridging group that connects (X(1)) and (X(2)). (X(3)) and (X(4)) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, substituted organometallic groups, and combinations thereof. (X(2)) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, substituted organometallic groups, and combinations thereof. Substituents on (X(2)) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, hydrogen, and combinations thereof. At least one substituent on (X(2)) can be a bridging group that connects (X(1)) and (X(2)).

Depending upon the desired properties of the polymer (e.g., polyolefin, such as polyethylene) to be produced within polymerization zone 110/210/310, any number of catalyst components can be introduced via one or more catalyst feed line 130/230/330 of catalyst delivery system 100/200/300. In embodiments, between one and six catalyst components are introduced via one or more catalyst feed line(s) 130/230/330; alternatively, between one and four catalyst components are introduced via one or more catalyst feed line(s) 130/230/330; and alternatively, between one and three catalyst components are introduced via one or more catalyst feed line(s) 130/230/330.

In embodiments, activator is introduced from activator feed source 105/205/305 to catalyst delivery system 100/200/300 for the activation, conversion, or reduction of the catalyst introduced from catalyst source 103/203/303 to the active state for polymerization. Activator from activator source 105/205/305 can be any activator suitable for activation, conversion, or reduction of the catalyst from catalyst source 103/203/303 to the active state for polymerization, such as, for example, a treated solid oxide, borates and methylaluminoxane. In an exemplary embodiment, the activator in activator source 105/205/305 is a treated solid oxide. More particularly, in some embodiments, the activator in activator source 105/205/305 is a super solid acid (SSA) initiator. Other suitable activators will be apparent to those of skill in the art, and are to be considered within the scope of the disclosure.

In embodiments, the catalyst or the activator is impregnated with another catalyst or activator, or otherwise combined with another catalyst or activator, such as a polymerization catalyst component impregnated with an activator. In an exemplary embodiment, catalyst in the form of a metallocene catalyst is impregnated with an activator. For such instances, the combined components can be referred to as a single component, and one or more of the impregnated components can be omitted from the description herein. (That is, in embodiments in which an activator-impregnated catalyst is provided in catalyst source 103/203/303, catalyst source 103/203/303 may also be considered an activator source, and a specific activator source 105/205/305 may be omitted.)

In embodiments, a co-catalyst is provided from co-catalyst source 107/207/307 to catalyst delivery system 100/200/300 as an alkylator, electron donor, or for reduction of the catalyst in catalyst source 103/203/303 or specifically as the active metal species of the catalyst provided via catalyst source 103/203/303. The co-catalyst can be any co-catalyst component suitable as an alkylator, electron donor, or for reduction, such as, for example, trimethylaluminum, triethylaluminum (TEAl), tripropylaluminum, diethylaluminum ethoxide, tributylaluminum, diisobutylaluminum hydride, triisobutylaluminum hydride, triisobutylaluminum (TiBAl), trihexylaluminum, and diethylaluminum chloride. In an exemplary embodiment, the co-catalyst provided via co-catalyst source 107/207/307 is TEAl TiBAl, or a combination there. In an embodiment, the co-catalyst provided via co-catalyst source 107/207/307 includes at least one aluminum alkyl component. Catalyst delivery system 100/200/300 can include or be configured for operation with any number of co-catalyst components or co-catalyst sources 107/207/307. In embodiments, catalyst delivery system 100/200/300 includes one or two co-catalyst components or co-catalyst sources 107/207/307. In embodiments, the co-catalyst is a mixture of any of the different types of co-catalyst components set forth herein. For example, in embodiments, TEAl and TiBAl can both be added to catalyst delivery system 100/200/300 via one or more co-catalyst feed line(s) 150/250/350 to act jointly as the co-catalyst. The TEAl and TiBAl can be premixed, such as in precontactor 215/315, and added to polymerization zone 110/210/310 together, or they can be fed directly to polymerization zone 110/210/310 individually as separate feed streams, or a combination thereof.

In embodiments, a diluent is provided to catalyst delivery system 100/200/300 via diluent feed source 109/209/309A to control the concentration of the various components (i.e., catalyst from catalyst source 103/203/303, activator from activator source 105/205/305, co-catalyst from co-catalyst feed line 107/207/307, or a combination thereof) within delivery system 100/200/300. For example, the concentrations of the various components introduced via line(s) 130/230/330, 140/240/340, or 150/250/350 can be increased by decreasing the volume of the diluent added to system 100/200/300 via diluent source 109/209/309A and diluent feed line 160/260/360A. Similarly, the concentrations of the various components from sources 103/203/303, 105/205/305, and 107/207/307 can be decreased by increasing the volume of the diluent added to system 100/200/300. The diluent in diluent source 109/209/309A can be any diluent component (e.g., inert hydrocarbon) suitable for use in catalyst delivery system 100/200/300, such as, without limitation, propane, isobutane, pentane, hexane, heptane, or octane. When the polymerization process is used to produce polypropylene, unreacted propylene can be used as a diluent. In an exemplary embodiment, the diluent is or comprises isobutane. Other suitable diluent components will be apparent to those of skill in the art and are to be considered within the scope of the disclosure.

As noted hereinabove, the diluent and each of the components (catalyst from catalyst source 103/203/303, activator from activator source 105/205/305, co-catalyst from co-catalyst source 107/207/307, or a combination thereof) are delivered to the system 100/200/300 from a source 101/201/301. The source can be a run tank, storage tank, mix tank, flow pipe, mud pot, or another device, system or process that can deliver a suitable amount of the respective diluent to diluent feed line 160/260/360, polymerization catalyst to catalyst feed line 130/230/330, activator to activator feed line 140/240/340, co-catalyst to co-catalyst feed line 150/250/350, or a combination thereof, for producing a desirable property in the polymer (e.g., polyolefin) to be produced by system 100/200/300. For example, the diluent can be delivered to and stored in a run tank, which serves as diluent source 109/209/309A, until called upon by system 100/200/300. When system 100/200/300 calls upon an amount of diluent, an associated feed pump (not shown) can be activated to deliver the amount of diluent from the run tank source 109/209/309A to another part of system 100/200/300. Those skilled in the art will recognize that a conventional run tank and feed pump combination can be used in accordance with the disclosed embodiments to store and deliver sufficient amounts of the diluent from diluent source 109/209/309A and each of the components from sources 103/203/303, 105/205/305, and 107/207/307A, when called upon by system 100/200/300.

Also disclosed herein is a catalyst injection system comprising the enhanced precontactor as described hereinabove. The catalyst injection system comprises a catalyst stream, a diluent stream, and an enhanced precontactor according to this disclosure. A catalyst injection system will now be described with reference to FIG. 3. The enhanced precontactor 315 comprises at least two mixing stages arranged in series, each of the at least two mixing stages being in continuous-stirred-tank-reactor configuration, wherein a first stage of the at least two mixing stages receives contents comprising a catalyst obtained from the catalyst stream introduced via catalyst feed line 330 and a diluent obtained from a diluent stream introduced via diluent feed line 360A. In embodiments, enhanced precontactor 315 is configured such that greater than about 70%-100%, inclusive, of the contents pass through the at least two mixing stages in one residence time. In embodiments, one residence time comprises a time in the range of from about 5 minutes to about 30 minutes.

In embodiments, as noted hereinabove, enhanced precontactor 315 further comprises a recirculation pump 345 positioned to receive an effluent of enhanced precontactor 315; and a flow controller 345 positioned between recirculating pump 345 and a polymerization zone 310, wherein recirculation pump 345 recycles a first portion of the effluent to the first stage of the at least two mixing stages and pumps a second portion of the effluent to flow controller 322A/322B, and wherein flow controller 322A/322B controls a flow of the second portion to polymerization zone 310.

In embodiments of the herein-disclosed catalyst injection system, enhanced precontactor 315 includes the at least two mixing stages contained in a single vessel which are defined by internals of the vessel 318, wherein one or more agitators 316 in the vessel mix the contents passing through each of the at least two mixing stages.

In embodiments of the catalyst injection system, the catalyst stream introduced via catalyst feed line 330 includes a catalyst flow control device 332 which adjusts (e.g., increases or decreases) a first catalyst flow rate to a second catalyst flow rate upon a detection of a change in one or more of: (i) a concentration of the catalyst in the catalyst stream; (ii) a concentration of monomer in polymerization zone 310; and (iii) a polymer production rate of polymerization zone 310.

In embodiments, the catalyst injection system further comprises: at least one of: a co-catalyst stream introduced via co-catalyst feed line 350, wherein the first stage of the at least two mixing stages receives a co-catalyst obtained from the co-catalyst stream, wherein the co-catalyst stream includes a co-catalyst flow control device 352 which adjusts a first co-catalyst flow rate to a second co-catalyst flow rate upon a detection of a concentration in a concentration of co-catalyst in the co-catalyst stream; and an activator stream introduced via activator feed line 340, wherein the first stage of the at least two mixing stages receives an activator obtained from the activator stream, wherein the activator stream includes an activator flow control device 342 which adjusts a first activator flow rate to a second activator flow rate upon a detection of a change in a concentration of the activator in the activator stream, and wherein the contents which are received by enhanced precontactor 315 further comprise the co-catalyst, the activator, or both.

Also disclosed herein is a method of delivering catalyst into a polymerization zone via the herein-disclosed catalyst delivery system. According to this disclosure, the operability of a polymerization process may be improved by measuring the concentration of at least one of the catalyst components that is fed to polymerization zone 110/210/310. Without being limited by theory, precise measuring of the concentration of and adjusting of the flow of the catalyst component in response to said measured concentration(s) may minimize the potential for catalyst leakage or misdirected catalyst flow, and may also eliminate the need for charge tanks, mix tanks, or run tanks, which can be large, complex, and difficult to clean during catalyst change-out.

In embodiments, the process comprises detecting one or a combination of: (i) a change in a concentration of the catalyst in a catalyst feed stream upstream of the polymerization zone 110/210/310, (ii) a change in a concentration of monomer (e.g., ethylene) in polymerization zone, or (iii) a change in a polymer production rate of polymerization zone 110/210/310; adjusting (e.g., increasing or decreasing) a first catalyst flow rate of the catalyst in the catalyst feed stream to a second catalyst flow rate based on the one or a combination of (i), (ii), or (iii); and introducing the catalyst into polymerization zone 110/210/310 downstream of a location in the catalyst feed stream where the step of adjusting is performed. Such a method will now be described with reference to FIG. 1. Catalyst is metered to polymerization zone 110 via catalyst source 103 and catalyst feed line 130. In embodiments, catalyst is metered into high pressure (e.g., 600 psig (4.1 MPA)) slurry reactor, with precision control over a wide range. A simple inline metering device may be utilized to combine the catalyst stream (which may be in a solid, free-flowing form) with diluent flush, thus avoiding the need for feeding gas with the catalyst. In embodiments, the catalyst is educated out using hot diluent vapor, which is then condensed to provide a catalyst solution. In embodiments, the catalyst addition rate is in the range of from about 10 lb/h to about 40 lb/h (from about 4.5 kg/h to about 13.6 kg/h), from about 0.3 lb/h to about 120 lb/h (from about 0.14 kg/h to about 54.4 kg/h), or from about 3 lb/h to about 120 lb/h (from about 1.4 kg/h to about 54.4 kg/h). For example, high activity metallocene catalysts may be added at a rate toward the lower end of the provided ranges, in embodiments. The inline metering device can be one or more rotary valves, ball check feeders, or a combination thereof.

In embodiments, an activator is metered to polymerization reactor 110 via activator source 105 and activator feed line 140, a co-catalyst is metered to polymerization reactor 110 via co-catalyst source 107 and co-catalyst feed line 150, a diluent is metered to polymerization reactor 110 via diluent source 109 and diluent feed line 160, or a combination thereof. One or more of the catalyst, activator, co-catalyst, and diluent may be combined prior to introduction into polymerization reactor 110, or added separately thereto. For example, in the embodiment of FIG. 1, catalyst and activator are combined in line 114A, co-catalyst and diluent are combined in line 114B, and lines 114A and 114B are combined for introduction into polymerization reactor 110 via catalyst system feed line 112. Monomer, such as ethylene, is introduced from monomer source 111 and monomer feed line 170 into polymerization reactor 110. Product polymer is extracted from polymerization reactor 110 via product outlet line 180.

The concentration of catalyst in catalyst feed line 130 is measured by sensor 131. The concentration of monomer may be measured by sensor 171 (or a sensor within polymerization reactor/zone 110). The polymer production rate may be determined, for example, utilizing flow device 181 or another means. In embodiments, the method comprises detecting a change in the concentration of catalyst, a change in the concentration of monomer in polymerization zone 110, a change in the polymer production rate, or a combination thereof, and adjusting (e.g., increasing or decreasing) the catalyst flow rate in catalyst feed line 130 based on a combination of one or more thereof, and introducing the catalyst into polymerization zone 110 downstream of a location where the adjusting is performed. Control system 120 may be utilized to detect a change in the concentration of catalyst, a change in the concentration of monomer in polymerization zone 110, a change in the polymer production rate, or a combination thereof, and send a signal to flow device 132 (e.g., valve) to adjust the catalyst flow rate in catalyst feed line 130.

In embodiments, the change in the catalyst concentration is detected at a first location upstream of polymerization zone 110; adjusting comprises adjusting, at a second location upstream of polymerization zone 110, a first catalyst flow rate of the catalyst feed stream to a second catalyst flow rate; and introducing the catalyst into polymerization zone 110 comprises introducing the catalyst into polymerization zone 110 downstream of the first location and the second location in the catalyst feed stream.

In embodiments, detecting comprises detecting one or a combination of: (i) a first concentration of the catalyst in a catalyst feed stream introduced via catalyst feed line 130 via sensor 131 at a first location upstream of polymerization zone 110, and a second concentration of the catalyst in the catalyst feed stream at the first location upstream of polymerization zone 110, (ii) a first concentration of monomer in polymerization zone 110 and a second concentration of monomer in polymerization zone 110, or (iii) a first polymer production rate of polymerization zone 110 and a second polymer production rate of polymerization zone 110, and the method further comprises: comparing one or a combination of: (a) the first concentration of the catalyst to the second concentration of the catalyst to calculate an absolute value of a change in concentration of the catalyst, wherein the absolute value of the change in concentration of the catalyst is greater than a threshold catalyst concentration value, (b) the first concentration of monomer to the second concentration of monomer to calculate an absolute value of a change in concentration of monomer, wherein the absolute value of change in the concentration of monomer is greater than a threshold monomer concentration value, or (c) the first polymer production rate to the second polymer production rate to calculate an absolute value of a change in the polymer production rate, wherein the absolute value of the change in the polymer production rate is greater than a threshold production rate value, and adjusting further comprises: adjusting (e.g., increasing or decreasing), at a second location upstream of the first location, a first catalyst flow rate of the catalyst in the catalyst feed stream to a second catalyst flow rate based on the one or a combination of (a), (b), or (c); and introducing comprises: introducing the catalyst having a third concentration into polymerization zone 110 downstream of the first location and the second location in the catalyst feed stream.

The catalyst flow rate (i.e., the first catalyst flow rate, the second catalyst flow rate, or both) may be in the range of from about 0.3 lb/h to about 120 lb/h (from about 0.14 kg/h to about 54.4 kg/h) from about 3 lb/h to about 120 lb/h (from about 1.4 kg/h to about 54.4 kg/h), or from about 10 lb/h to about 40 lb/h (from about 4.5 kg/h to about 18.1 kg/h).

In embodiments, the catalyst is combined with a diluent as described hereinabove for flow to polymerization zone 110. In such embodiments, the method may further comprise combining, downstream of the location in the catalyst feed stream where adjusting is performed, the catalyst with the diluent to yield a catalyst system stream 112, and introducing catalyst system stream 112 to polymerization zone 110. In embodiments, a catalyst (e.g., a chromium-based catalyst) is utilized with a diluent, and no co-catalyst or activator is utilized.

In embodiments, a catalyst system comprising an activator, a co-catalyst, or both, as described above, is utilized in combination with the catalyst. For example, a Ziegler Natta or metallocene catalyst may be utilized in conjunction with a co-catalyst, such as, without limitation, an alkylating or electron withdrawing source, as described hereinabove. In such embodiments, the method may further comprise detecting a change in concentration of the co-catalyst in a co-catalyst feed stream introduced via co-catalyst feed line 150 via sensor 151, adjusting (e.g., increasing or decreasing) a first co-catalyst flow rate in the co-catalyst feed stream to a second co-catalyst flow rate based on the change in concentration of the co-catalyst; and introducing the co-catalyst into polymerization zone 110 downstream of a location in the co-catalyst feed stream where the step of adjusting the first co-catalyst flow rate is performed. In such embodiments, the catalyst feed stream, the co-catalyst feed stream, and a diluent may be combined to form a catalyst system stream 112, which flows into polymerization zone 110.

A metallocene catalyst may be utilized in further conjunction with an activator, such as a super solid acid or 'SSA', as described hereinabove. In such embodiments, the method may further comprise detecting, upstream of polymerization zone 110 and via sensor 141, a change in concentration of an activator in a activator feed stream introduced via activator feed line 140; adjusting (e.g., increasing or decreasing) a first activator flow rate in the activator feed stream to a second activator flow rate based on the change in concentration of the activator; and introducing the activator into polymerization zone 110 downstream of a location in the activator feed stream where the step of adjusting the first activator flow rate is performed. In such embodiments, the catalyst feed stream, the co-catalyst feed stream, the activator feed stream, and a diluent may be combined to form a catalyst system stream 112, which flows into polymerization zone 110.

As discussed with regard to FIG. 2, the method may further comprise prior to the step of introducing the catalyst system stream to polymerization zone 110, introducing contents comprising the catalyst system stream and the diluent to a precontactor 215. As discussed hereinabove with reference to FIG. 3, such a precontactor may be a modified CSTR 315 comprising at least two mixing stages in series, each of the at least two mixing stages being in a continuous-stirred-tank-reactor configuration, and the catalyst flows into polymerization zone 210/310 via an effluent of precontactor 215/315. In embodiments, greater than about 70% of the contents pass through precontactor 215/315 in one residence time, wherein one residence time may be in the range of from about 5 minutes to about 30 minutes. In embodiments, a first portion of the effluent is recirculated to a first stage of the at least two mixing stages, and a second portion of the effluent is introduced to polymerization zone 210/310.

Embodiments of this disclosure which provide for improved catalyst feeding by metering of catalysts and components into a reactor (or precontactor), measuring the concentration of the various components, and adjusting the feed rate of each component as desired in response to the measurement of that component may enable an elimination or reduction in the extensive mixing and dilution that is conventionally utilized. For example, the need for large, complex, and difficult to clean charge tanks, mix tanks, or run tanks with associated slurry pumps (e.g., diaphragm slurry pumps) that are conventionally utilized to prepare dilute catalyst mixtures may be eliminated or reduced via the disclosed catalyst feeding system. As the disclosed method and system, in embodiments, provide for catalyst preparation without diluting catalysts in tanks, the concentration of the components of the catalyst system may vary (unlike the concentration in a conventional mix tank, which is held uniform), as the absolute concentration thereof is not critical because it can be adjusted by adjusting the flow rate of that particular component into the reactor or precontactor. Such a catalyst feeding system comprising metering of catalyst components, measurement of the concentration(s) thereof, and adjusting the flow rate(s) thereof in response to the measurement(s) may provide for reduced capital costs, improved control of the reaction system (e.g., improved product composition), reduced equipment maintenance, and other benefits as will be apparent to those of skill in the art.

Embodiments of this disclosure provide for an enhanced precontactor. Utilization of such an enhanced precontactor may help to ensure adequate overall residence time such that substantially all of the catalyst components reach equilibrium onto the solid catalyst particles. The more uniform catalyst thus obtained may provide for improved polymer product being formed in the downstream polymerization reactor(s).

ADDITIONAL DISCLOSURE

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

A: A process for introducing a catalyst into a polymerization zone, the process comprising: detecting one or a combination of: (i) a change in a concentration of the catalyst in a catalyst feed stream upstream of the polymerization zone, (ii) a change in a concentration of monomer in the polymerization zone, and (iii) a change in a polymer production rate of the polymerization zone; adjusting a first catalyst flow rate of the catalyst in the catalyst feed stream to a second catalyst flow rate based on the one or a combination of (i), (ii), and (iii); and introducing the catalyst into the polymerization zone downstream of a location in the catalyst feed stream where the step of adjusting is performed.

B: A process for introducing a catalyst into a polymerization zone, the process comprising: detecting one or a combination of: (i) a change in concentration of the catalyst in a catalyst feed stream at a first location upstream of the polymerization zone, (ii) a change in a concentration of monomer in the polymerization zone, and (iii) a change in a polymer production rate of the polymerization zone; adjusting, at a second location upstream of the polymerization zone, a first catalyst flow rate of the catalyst in the catalyst feed stream to a second catalyst flow rate based on the one or a combination of (i), (ii), and (iii); and introducing the catalyst into the polymerization zone downstream of the first location and the second location in the catalyst feed stream.

C: A process for introducing a catalyst into a polymerization zone, the process comprising: detecting one or a combination of: (i) a first concentration of the catalyst in a catalyst feed stream at a first location upstream of the polymerization zone, and a second concentration of the catalyst in the catalyst feed stream at the first location upstream of the polymerization zone, (ii) a first concentration of monomer in the polymerization zone and a second concentration of monomer in the polymerization zone, and (iii) a first polymer production rate of the polymerization zone and a second polymer production rate of the polymerization zone; comparing one or a combination of: (a) the first concentration of the catalyst to the second concentration of the catalyst to calculate an absolute value of a change in concentration of the catalyst, wherein the absolute value of the change in concentration of the catalyst is greater than a threshold catalyst concentration value, (b) the first concentration of monomer to the second concentration of monomer to calculate an absolute value of a change in concentration of monomer, wherein the absolute value of change in the concentration of monomer is greater than a threshold monomer concentration value, and (c) the first polymer production rate to the second polymer production rate to calculate an absolute value of a change in the polymer production rate, wherein the absolute value of the change in the polymer production rate is greater than a threshold production rate value; adjusting, at a second location upstream of the first location, a first catalyst flow rate of the catalyst in the catalyst feed stream to a second catalyst flow rate based on the one or a combination of (a), (b), and (c); and introducing the catalyst having a third concentration into the polymerization zone downstream of the first location and the second location in the catalyst feed stream.

D: A catalyst injection system comprising: a catalyst stream; a diluent stream; and a precontactor comprising at least two mixing stages arranged in series, each of the at least two mixing stages being in continuous-stirred-tank-reactor configuration, wherein a first stage of the at least two mixing stages receives contents comprising a catalyst obtained from the catalyst stream and a diluent obtained from the diluent stream, and wherein the precontactor is configured such that greater than about 70% of the contents pass through the at least two mixing stages in one residence time of about 5 minutes to about 30 minutes.

Each of embodiments A, B, C, and D may have one or more of the following additional elements. Element 1: wherein the polymerization zone comprises one or more of a batch reactor, a continuous stirred tank reactor, a loop slurry reactor, a gas phase reactor, an autoclave reactor, and a tubular reactor having a configuration of one or more of a fluidized bed, a fixed bed, a stirred bed, and a stirred fluidized bed. Element 2: wherein each of the first catalyst flow rate and the second catalyst flow rate is a value of about 0.3 lb/h (0.14 kg/h) to about 120 lb/h (54.4 kg/h). Element 3: further comprising: downstream of the location in the catalyst feed stream where the step of adjusting is performed, combining the catalyst with a diluent to yield a catalyst system stream; and introducing the catalyst system stream to the polymerization zone. Element 4: further comprising: prior to the step of introducing the catalyst system stream to the polymerization zone, introducing contents comprising the catalyst and the diluent to a precontactor having at least two mixing stages in series, each of the at least two mixing stages being in a continuous-stirred-tank-reactor configuration, wherein greater than about 70% of the contents pass through the precontactor in one residence time, wherein one residence time in the range of from about 5 minutes to about 30 minutes, and wherein the catalyst flows into the polymerization zone via an effluent of the precontactor. Element 5: wherein the catalyst is a chromium-based catalyst. Element 6: wherein a first portion of the effluent is recirculated to a first stage of the at least two mixing stages, and wherein a second portion of the effluent flows to the polymerization zone. Element 7: wherein the catalyst is a Ziegler-Natta catalyst or a metallocene catalyst, and the process further comprises: detecting a change in concentration of a co-catalyst in a co-catalyst feed stream upstream of the polymerization zone; adjusting a first co-catalyst flow rate in the co-catalyst feed stream to a second co-catalyst flow rate based on the change in concentration of the co-catalyst; introducing the co-catalyst into the polymerization zone downstream of a location in the co-catalyst feed stream where the step of adjusting the first co-catalyst flow rate is performed. Element 8: wherein the catalyst feed stream, the co-catalyst feed stream, and a diluent combine to form a catalyst system stream, which flows into the polymerization zone. Element 9: wherein the catalyst feed stream, the co-catalyst feed stream, and a diluent combine to form a catalyst system stream, and the process further comprises: introducing contents comprising the catalyst system stream and a diluent to a precontactor having at least two mixing stages in series, each of the at least two mixing stages being in a continuous-stirred-tank-reactor configuration, wherein greater than about 70% of the contents pass through the precontactor in one residence time of, or greater than, about 5 minutes to about 30 minutes, and wherein the catalyst and the co-catalyst flow into the polymerization zone via an effluent of the precontactor. Element 10: wherein the catalyst is a metallocene catalyst, and the process further comprises: detecting a change in concentration of an activator in a activator feed stream upstream of the polymerization zone; adjusting a first activator flow rate in the activator feed stream to a second activator flow rate based on the change in concentration of the activator; and introducing the activator into the polymerization zone downstream of a location in the activator feed stream where the step of adjusting the first activator flow rate is performed. Element 11: wherein the catalyst feed stream, the co-catalyst feed stream, the activator feed stream, and a diluent combine to form a catalyst system stream which flows into the polymerization zone. Element 12: wherein the catalyst feed stream, the co-catalyst feed stream, the activator feed stream, and a diluent combine to form a catalyst system stream, and the process further comprises: introducing contents comprising the catalyst system stream and a diluent to a precontactor having at least two mixing stages in series, each of the at least two mixing stages being in a continuous-stirred-tank-reactor configuration, wherein greater than about 70% of the contents pass through the precontactor in one residence time of, or greater than, about 5 minutes to about 30 minutes, and wherein the catalyst, the co-catalyst, and the activator flow into the polymerization zone via an effluent of the precontactor. Element 13: wherein the precontactor further comprises: a recirculation pump positioned to receive an effluent of the precontactor; and a flow controller positioned between the recirculating pump and a polymerization zone, wherein the recirculation pump recycles a first portion of the effluent to the first stage of the at least two mixing stages and pumps a second portion of the effluent to the flow controller, and wherein the flow controller controls a flow of the second portion to the polymerization zone. Element 14: wherein the precontactor includes the at least two mixing stages contained in a single vessel which are defined by internals of the vessel, wherein one or more agitators in the vessel mix the contents passing through each of the at least two mixing stages. Element 15: wherein the catalyst stream includes a catalyst flow control device which adjusts a first catalyst flow rate to a second catalyst flow rate upon a detection of a change in one or more of: (i) a concentration of the catalyst in the catalyst stream; (ii) a concentration of monomer in a polymerization zone; and (iii) a polymer production rate of the polymerization zone. Element 16: further comprising: at least one of: a co-catalyst stream, wherein the first stage of the at least two mixing stages receives a co-catalyst obtained from the co-catalyst stream, wherein the co-catalyst stream includes a co-catalyst flow control device which adjusts a first co-catalyst flow rate to a second co-catalyst flow rate upon a detection of a change in a concentration of the co-catalyst in the co-catalyst stream; or an activator stream, wherein the first stage of the at least two mixing stages receives an activator obtained from the activator stream, wherein the activator stream includes an activator flow control device which adjusts a first activator flow rate to a second activator flow rate upon a detection of a change in a concentration of the activator in the activator stream, and wherein the contents which are received by the precontactor further comprise the co-catalyst, the activator, or both. Element 17: wherein the monomer comprises ethylene.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention.

What is claimed is:

1. A process for introducing a catalyst into a polymerization zone, the process comprising:
   detecting one or a combination selected from a group consisting of:
   i) a change in a concentration of the catalyst in a catalyst feed stream upstream of the polymerization zone,
   ii) a change in a concentration of monomer in the polymerization zone, and
   iii) a change in a polymer production rate of the polymerization zone;
   adjusting a first catalyst flow rate of the catalyst in the catalyst feed stream to a second catalyst flow rate based on the one or a combination selected from a group consisting of i), ii), and iii); and
   introducing the catalyst into the polymerization zone downstream of a location in the catalyst feed stream where the step of adjusting is performed;
   wherein each of the first catalyst flow rate and the second catalyst flow rate is a value of about 0.3 lb/h (0.14 kg/h) to about 0.120 lb/h (54.4 kg/h).

2. The process of claim 1, wherein the polymerization zone comprises one or more of a batch reactor, a continuous stirred tank reactor, a loop slurry reactor, a gas phase reactor, an autoclave reactor, and a tubular reactor having a configuration of one or more of a fluidized bed, a fixed bed, a stirred bed, and a stirred fluidized bed.

3. The process of claim 1, further comprising:
   downstream of the location in the catalyst feed stream where the step of adjusting is performed, combining the catalyst with a diluent to yield a catalyst system stream; and
   introducing the catalyst system stream to the polymerization zone.

4. The process of claim 3, further comprising:
   prior to the step of introducing the catalyst system stream to the polymerization zone, introducing contents comprising the catalyst and the diluent to a precontactor having at least two mixing stages arranged in series, each of the at least two mixing stages being in a continuous-stirred-tank-reactor configuration,
   wherein greater than about 70% of the contents pass through the precontactor in one residence time,
   wherein one residence time in the range of from about 5 minutes to about 30 minutes, and
   wherein the catalyst flows into the polymerization zone via an effluent of the precontactor.

5. The process of claim 4, wherein the catalyst is a chromium-based catalyst.

6. The process of claim 4, wherein a first portion of the effluent is recirculated to a first stage of the at least two mixing stages, and wherein a second portion of the effluent flows to the polymerization zone.

7. The process of claim 1, wherein the catalyst is a Ziegler-Natta catalyst or a metallocene catalyst, the process further comprising:
   detecting a change in concentration of a co-catalyst in a co-catalyst feed stream upstream of the polymerization zone;
   adjusting a first co-catalyst flow rate in the co-catalyst feed stream to a second co-catalyst flow rate based on the change in concentration of the co-catalyst;
   introducing the co-catalyst into the polymerization zone downstream of a location in the co-catalyst feed stream where the step of adjusting the first co-catalyst flow rate is performed.

8. The process of claim 7, wherein the catalyst feed stream, the co-catalyst feed stream, and a diluent combine to form a catalyst system stream, which flows into the polymerization zone.

9. The process of claim 7, wherein the catalyst feed stream, the co-catalyst feed stream, and a diluent combine to form a catalyst system stream, the process further comprising:
   introducing contents comprising the catalyst system stream and a diluent to a precontactor having at least two mixing stages in series, each of the at least two mixing stages being in a continuous-stirred-tank-reactor configuration,
   wherein greater than about 70% of the contents pass through the precontactor in one residence time of, or greater than, about 5 minutes to about 30 minutes, and
   wherein the catalyst and the co-catalyst flow into the polymerization zone via an effluent of the precontactor.

10. The process of claim 9, wherein a first portion of the effluent is recirculated to a first stage of the at least two mixing stages, and wherein a second portion of the effluent flows to the polymerization zone.

11. The process of claim 7, wherein the catalyst is a metallocene catalyst, the process further comprising:
    detecting a change in concentration of an activator in a activator feed stream upstream of the polymerization zone;

adjusting a first activator flow rate in the activator feed stream to a second activator flow rate based on the change in concentration of the activator; and introducing the activator into the polymerization zone downstream of a location in the activator feed stream where the step of adjusting the first activator flow rate is performed.

12. The process of claim 11, wherein the catalyst feed stream, the co-catalyst feed stream, the activator feed stream, and a diluent combine to form a catalyst system stream which flows into the polymerization zone.

13. The process of claim 11, wherein the catalyst feed stream, the co-catalyst feed stream, the activator feed stream, and a diluent combine to form a catalyst system stream, the process further comprising:

introducing contents comprising the catalyst system stream and a diluent to a precontactor having at least two mixing stages in series, each of the at least two mixing stages being in a continuous-stirred-tank-reactor configuration, wherein greater than about 70% of the contents pass through the precontactor in one residence time of, or greater than, about 5 minutes to about 30 minutes, and wherein the catalyst, the co-catalyst, and the activator flow into the polymerization zone via an effluent of the precontactor.

14. The process of claim 13, wherein a first portion of the effluent is recirculated to a first stage of the at least two mixing stages, and wherein a second portion of the effluent flows to the polymerization zone.

15. A catalyst injection system comprising:
a catalyst stream;
a diluent stream; and
a precontactor comprising at least two mixing stages arranged in series, each of the at least two mixing stages being in continuous-stirred-tank-reactor configuration, wherein a first stage of the at least two mixing stages receives contents comprising a catalyst obtained from the catalyst stream and a diluent obtained from the diluent stream, and wherein the precontactor is configured such that greater than about 70% of the contents pass through the at least two mixing stages in one residence time of about 5 minutes to about 30 minutes.

16. The catalyst injection system of claim 15, wherein the precontactor further comprises:

a recirculation pump positioned to receive an effluent of the precontactor; and a flow controller positioned between the recirculating pump and a polymerization zone, wherein the recirculation pump recycles via a recycle stream a first portion of the effluent to the first stage of the at least two mixing stages and pumps a second portion of the effluent to the flow controller, and wherein the flow controller controls a flow of the second portion to the polymerization zone.

17. The catalyst injection system of claim 15, wherein the precontactor includes the at least two mixing stages contained in a single vessel which are defined by internals of the vessel, wherein one or more agitators in the vessel mix the contents passing through each of the at least two mixing stages.

18. The catalyst injection system of claim 15, wherein the catalyst stream includes a catalyst flow control device which adjusts a first catalyst flow rate to a second catalyst flow rate upon a detection of a change in one or a combination selected from the group consisting of:

i) a concentration of the catalyst in the catalyst stream;
ii) a concentration of monomer in a polymerization zone; and
iii) a polymer production rate of the polymerization zone.

19. The catalyst injection system of claim 18, further comprising:

at least one of:
a co-catalyst stream, wherein the first stage of the at least two mixing stages receives a co-catalyst obtained from the co-catalyst stream, wherein the co-catalyst stream includes a co-catalyst flow control device which adjusts a first co-catalyst flow rate to a second co-catalyst flow rate upon a detection of a change in a concentration of the co-catalyst in the co-catalyst stream; or an activator stream, wherein the first stage of the at least two mixing stages receives an activator obtained from the activator stream, wherein the activator stream includes an activator flow control device which adjusts a first activator flow rate to a second activator flow rate upon a detection of a change in a concentration of the activator in the activator stream, and wherein the contents which are received by the precontactor further comprise the co-catalyst, the activator, or both.

20. The process of claim 1 wherein the monomer comprises ethylene.

21. The catalyst injection system of claim 16,
wherein the recycle stream further comprises a solids analyzer configured to determine the solids content within the recycle stream;

wherein the catalyst injection system further comprises a solids make-up system feeding solids to the precontactor; and wherein the solids analyzer sends a signal to a solids flow control device to adjust a flow of solids from the solids make-up system to the precontactor as needed to maintain a desired solids level in the precontactor.

22. The catalyst injection system of claim 21, further comprising a level indicator configured to determine a fluid level within the precontactor and send a signal to a diluent flow control device to adjust a flow of diluent to the precontactor as needed to maintain a desired solids level in the precontactor.

23. The catalyst injection system of claim 22, wherein the solids make-up system further comprises a mudpot or a weigh feeder.

24. The catalyst injection system of claim 19, wherein the catalyst stream comprises a metallocene catalyst, the co-catalyst stream comprises an aluminum alkyl component, the activator stream comprises a super solid acid (SSA) initiator, and the monomer comprises ethylene.

25. The catalyst injection system of claim 17,
wherein the recycle stream further comprises a solids analyzer configured to determine the solids content within the recycle stream;

wherein the catalyst injection system further comprises a solids make-up system feeding solids to the precontactor;

wherein the solids make-up system further comprises a mudpot or a weigh feeder;

wherein the solids analyzer sends a signal to a solids flow control device to adjust a flow of solids from the solids make-up system to the precontactor as needed to maintain a desired solids level in the precontactor; and wherein the catalyst injection system further comprises a level indicator configured to determine a fluid level within the precontactor and send a signal to a diluent flow control device to adjust a flow of diluent to the precontactor as needed to maintain a desired solids level in the precontactor.

* * * * *